US006457060B1

(12) United States Patent
Martin et al.

(10) Patent No.: US 6,457,060 B1
(45) Date of Patent: *Sep. 24, 2002

(54) METHOD AND APPARATUS FOR FLEXIBLY LINKING TO REMOTELY LOCATED CONTENT ON A NETWORK SERVER THROUGH USE OF ALIASES

(75) Inventors: Bruce Martin, Palo Alto; Peter F. King, Half Moon Bay; Bruce V. Schwartz, San Mateo; Lawrence Michael Stein, San Jose, all of CA (US)

(73) Assignee: Openwave Systems Inc., Redwood City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 6 days.

(21) Appl. No.: 09/070,673

(22) Filed: Apr. 30, 1998

(51) Int. Cl.[7] ............................................... G06F 15/15
(52) U.S. Cl. ..................... 709/245; 709/203; 709/205; 709/217; 709/219; 709/229; 709/246; 707/10; 370/401
(58) Field of Search .................................. 709/200–203, 709/205–207, 217–219, 226–229, 245–246; 707/9–10, 104; 713/200–201; 370/401

(56) References Cited

U.S. PATENT DOCUMENTS

| 5,487,100 | A | * | 1/1996 | Kanc ............................ 709/206 |
| 5,673,322 | A | * | 9/1997 | Pepe et al. .................... 709/229 |
| 5,689,825 | A |   | 11/1997 | Averbuch et al. ........... 455/575 |
| 5,696,900 | A | * | 12/1997 | Nishigaya et al. .......... 709/229 |
| 5,751,961 | A | * | 5/1998 | Smyk .......................... 709/217 |
| 5,764,906 | A | * | 6/1998 | Edelstein et al. ............ 709/245 |

(List continued on next page.)

FOREIGN PATENT DOCUMENTS

| EP | 0 817 107 A2 | 1/1998 | ............ G06F/17/30 |
| WO | WO 97/19564 | 5/1997 | ............ G06F/13/14 |

OTHER PUBLICATIONS

HDML 2.0 Language Reference, Version 2.0, Unwired Planet, Inc. Software Developer Kit, Jul. 1997.
Berners–Lee, "Uniform Resource Locators", RFC1738, Network Working Group, Dec. 1994.
R. Fielding, "Relative Uniform Resource Locators", RFC 1808, Network Working Group, Jun. 1995.
Fielding et al., "Hypertext Transfer Protocol—HTTP/1.1", HTTP Working Group, Aug. 1996.
UP.SDK Developer's Guide, Version 2.0.2, Unwired Planet, Inc., Jan. 1998.

*Primary Examiner*—Bharat Barot
(74) *Attorney, Agent, or Firm*—Beyer Weaver & Thomas, LLP

(57) ABSTRACT

Aliasing techniques that permit flexibly linking to remotely located resources are disclosed. The aliasing techniques are used by a browser application to link to a remote resource located on a network (e.g., the Internet) when the location of the remote resource is initially unknown or likely to be changed based on events external to the browser application. For example, the external events can include: relocation of the remote resource, use of a different device, user or carrier service to access the remote resource, or selection of different service levels. In one embodiment, a browser application executes on a wireless remote computing device and couples to a network gateway via a carrier network. The aliasing techniques are provided by sending alias information from the network gateway to the browser application, and then having the browser application form an alias table and store the alias table in the wireless remote computing device. The wireless remote computing device can be any of a wide range of devices that have wireless and computing capabilities, including a cellular phone, a personal digital assistant and a portable general purpose computer.

43 Claims, 12 Drawing Sheets

U.S. PATENT DOCUMENTS

| | | | | |
|---|---|---|---|---|
| 5,774,664 A | * | 6/1998 | Hidary et al. | 709/218 |
| 5,855,020 A | * | 12/1998 | Kirsch | 709/218 |
| 5,864,852 A | * | 1/1999 | Luotonen | 709/246 |
| 5,905,865 A | * | 5/1999 | Palmer et al. | 709/217 |
| 5,913,032 A | * | 6/1999 | Schwartz et al. | 709/245 |
| 5,958,018 A | * | 9/1999 | Eng et al. | 709/246 |
| 5,987,508 A | * | 11/1999 | Agraharam et al. | 709/217 |
| 6,032,196 A | * | 2/2000 | Monier | 709/245 |
| 6,061,738 A | * | 5/2000 | Osaku et al. | 709/245 |
| 6,085,231 A | * | 7/2000 | Agraharam et al. | 709/206 |
| 6,092,204 A | * | 7/2000 | Baker | 713/201 |
| 6,101,537 A | * | 8/2000 | Edelatein et al. | 709/219 |
| 6,157,829 A | * | 12/2000 | Grube et al. | 455/414 |
| 6,195,707 B1 | * | 2/2001 | Minh | 709/245 |

* cited by examiner

METHOD AND APPARATUS FOR FLEXIBLY LINKING TO REMOTELY LOCATED CONTENT ON A NETWORK SERVER THROUGH USE OF ALIASES

BACKGROUND OF THE INVENTION

1. Field of the Invention

The present invention relates to computer networks, and more particularly, to accessing resources located in computer networks.

2. Description of the Related Art

The Internet has popularized the concept of linking one page (or document) to another page. Such linking is achieved by placing a link head in one page that points to a link tail where another page is located on the Internet. The link tail consists of a Universal Resource Locator (URL). Linking can also be used to link a computing device or its Internet browser running thereon to a home page. A home page is the initial page that the Internet browser displays to a user. The home page is normally set by the user of the Internet browser based on their preferences or set by a service provider that is facilitating the user's access to the Internet. Examples of Internet browsers are (i) Navigator by Netscape Corporation and (ii) Internet Explorer by Microsoft Corporation.

Additional details concerning Internet protocols, namely, Hypertext Transfer Protocol (HTTP), can be found in Fielding et al., HTTP 1.1, Aug. 12, 1996, which is hereby incorporated by reference. Also, Internet Standards (i) RFC 1738 (T. Lee et al., Uniform Resource Locators (URLs), Network Working Group, RFC 1738, December 1994) and (ii) RFC 1808 (R. Fielding, Relative Uniform Resource Locators, Network Working Group, RFC 1808, June 1995) are also both hereby incorporated by reference.

FIGS. 1A–1E are screen shots illustrating basic conventional displaying of a home page and linking to resources. These screen shots pertain to screens displayed to a user of Microsoft Internet Explorer, Version 3.0. FIG. 1A illustrates a representative home page having an address (i.e., URL) of "uplanet.com/". FIG. 1B illustrates the representative home page of FIG. 1A where a cursor is placed over a News/Events button on the representative home page. Note that the bottom left-hand portion of the representative home page shows a relative URL ("index.html") for the page containing information on the News/Events. Hence, the home page is linked to the News/Events page by a link associated with the News/Event button. FIG. 1C illustrates the News/Events page that is displayed after the user selects (e.g., "clicks on") the News/Events button. The address or URL for the News/Events page is "uplanet.com/new/index.html". The News/Events page also contains several local links, including links to Events, Press Releases, Table of Contents, Contact information, and Trademarks information, any of which link to another page that can be displayed to the user. For example, FIG. 1D illustrates the News/Events page when the user places a cursor over the Press Releases link. Note that in this event the bottom left-hand portion of the News/Events page shows a relative URL ("press.html") for the page containing information on the Press Releases. FIG. 1E illustrates the Press Release page ("uplanet.com/new/press.html") that is displayed after the user selects (e.g., "clicks on") the Press Release link on the News/Events page illustrated in FIG. 1D.

In any case, one disadvantage of conventional linking is that the location of the resource being linked to needs to be known when the links are created. The links cannot be properly established if the location of the resource is not known. In other words, a link (i.e., link head) cannot be properly established until the location of the resource (i.e., link tail) becomes known.

Another disadvantage is that once conventional links are established, if the location of the resource changes, the linking fails. In this case, it is said that the link URL (i.e., link head) to the resource (i.e., link tail) is incorrect, so the link fails. There are a number of reasons why the location of resources would subsequently change, including reorganization of a network server, change in service or network providers, and the like.

Often home pages (which are particular resources) are determined by some sort of linking from a pre-stored URL, although a user can often update the pre-stored URL should the location of the desired page for its home page be moved. In other words, if the location of the desired page for the home page moves, the pre-stored URL is referred to as being stale. Other links besides the pre-stored home page link can also go stale in the same way. FIGS. 1F and 1G illustrate screen shots of dialog boxes used with Microsoft Internet Explorer to change a pre-stored URL for a home page. In FIG. 1F, the screen shot shows that the home page address is "yahoo.com" which is a popular search engine for the Internet. In FIG. 1G, the screen shot shows that the home page address has been changed to "msn.com" for the Microsoft Network, which on Internet Explorer is the default home page.

Further, service or network providers often desire to control the home page for the user that is a subscriber to their services. In such cases, the disadvantages noted above severely hamper the ability of the service or network provider to move or change the home pages for users. Still further, if a common Internet browser is used to connect to different service or network providers who each want the user to use a different home page, then the home page displayed to the user will need to be different for the different service or network providers.

Thus, there is a need for techniques that provide improved linking such that the addressing of resources is location-independent.

SUMMARY OF THE INVENTION

Broadly speaking, the invention relates to aliasing techniques that permit flexibly linking to remotely located resources. The aliasing techniques are used by a browser application to link to a remote resource located on a network (e.g., the Internet) when the location of the remote resource is initially unknown or likely to be changed based on events external to the browser application. For example, the external events can include: relocation of the remote resource, use of a different device, change of user or carrier service to access the remote resource, or selection of different service levels.

In one embodiment of the invention, a browser application (program) executes on a remote computing device and couples to a network gateway via a carrier network. The aliasing techniques of the invention are provided by sending alias information from the network gateway to the browser application, and then having the browser application form an alias table and store the alias table in the remote computing device. The remote computing device can be any of a wide range of two-way interactive communication devices, including a mobile phone, a desktop telephone, a personal digital assistant, an Internet-capable remote controller and a portable general purpose computer.

The invention can be implemented in numerous ways, including as a method, an apparatus, and a computer system. Several embodiments of the invention are discussed below.

As a method for displaying a home page on a display screen associated with a remote computing device operating a browser program and being coupled to a network server, an embodiment of the invention includes the operations of: identifying an alias URL that corresponds to the home page to be displayed on the display screen; converting, within the remote computing device, the alias URL to a resulting URL; requesting the home page from the network server using the resulting URL; and thereafter displaying the home page received from the network server on the display screen.

As a method for displaying a page on a display screen associated with a remote wireless computing device operating a browser program and being coupled to a network server in a wireless manner, another embodiment of the invention includes the operations of: identifying a link URL that corresponds to a page to be displayed on the display screen by the browser program; determining whether the link URL is an alias URL; converting, within the remote wireless computing device, the link URL to a resulting URL when the determining operation determines that the link URL is an alias URL; requesting the page from the network server using the resulting URL; and thereafter displaying the page received from the network server on the display screen.

As an apparatus for displaying a page on a display screen of a computing device, an embodiment of the invention includes a memory that stores a browser and an alias table; and a device controller operatively coupled to the memory. The device controller operates to execute the browser, operates to evaluate link requests by the browser to determine whether the link requests are aliases, and, for each of the link requests that are determined to be an alias, operates to convert the alias to an actual link in accordance with alias information stored in the alias table. Optionally, the alias table can store at least one of an actual homepage link that corresponds to a homepage alias and an actual bookmark link that corresponds to a bookmark alias.

As a mobile device that couples to a network server, an embodiment of the invention includes a display screen; and a computer readable media storing computer program instructions for operating a browser program and for storing computer program instructions for displaying a page on the display screen. The computer program instructions for displaying the page on the display screen include: program code for identifying a link URL that corresponds to the page to be displayed on the display screen by the browser program; program code for determining whether the link URL is an alias URL; program code for converting the link URL to a resulting URL when the program code for determining determines that the link URL is an alias URL; program code for requesting the page from the network server using the resulting URL; and program code for displaying the page received from the network server on the display screen.

As a computer readable medium containing program code for displaying a page on a display screen associated with a remote computing device coupleable to a network server, an embodiment of the invention includes: first program code for identifying a link URL that corresponds to a page to be displayed on the display screen; second program code for determining whether the link URL is an alias URL; third program code for converting the link URL to a resulting URL when the second program code determines that the link URL is an alias URL; fourth program code for requesting the page from the network server using the resulting URL; and fifth program code for thereafter displaying the page received from the network server on the display screen.

As a method for managing pages displayed on a display screen associated with a computing device operating a browser program, an embodiment of the invention includes the operations of: identifying a link URL that corresponds to a page to be displayed on the display screen by the browser program; determining whether the link URL is an alias URL; converting the link URL to a resulting URL when the determining operation determines that the link URL is an alias URL; requesting the page from a remote network server using the resulting URL; thereafter displaying the page received from the remote network server on the display screen; and caching the page received from the remote network server based on the resulting URL.

The advantages of the invention are numerous. One advantage of the invention is that links can be created without prior knowledge of the location (e.g., URL) of the resource being linked. As a particular example, the aliasing techniques can provide flexible, in-browser linking to an appropriate home page or bookmark. Another advantage of the invention is that it allows network servers to relocate its resources or otherwise reorganize its site. Still another advantage of the invention is that external events can alter the linking to different resources even after the link (i.e., link head) is created.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to aliasing techniques that permit flexibly linking to remotely located resources. The aliasing techniques are used by a browser application to link to a remote resource located on a network (e.g., the Internet)

when the location of the remote resource is initially unknown or likely to be changed based on events external to the browser application. For example, the external events can include: relocation of the remote resource, use of a different device, changes of user or carrier service to access the remote resource, or selection of different service levels.

Embodiments of the invention are discussed below with reference to FIGS. 2–6B. However, those skilled in the art will readily appreciate that the detailed description given herein with respect to these figures is for explanatory purposes as the invention extends beyond these limited embodiments.

Figure 1A:
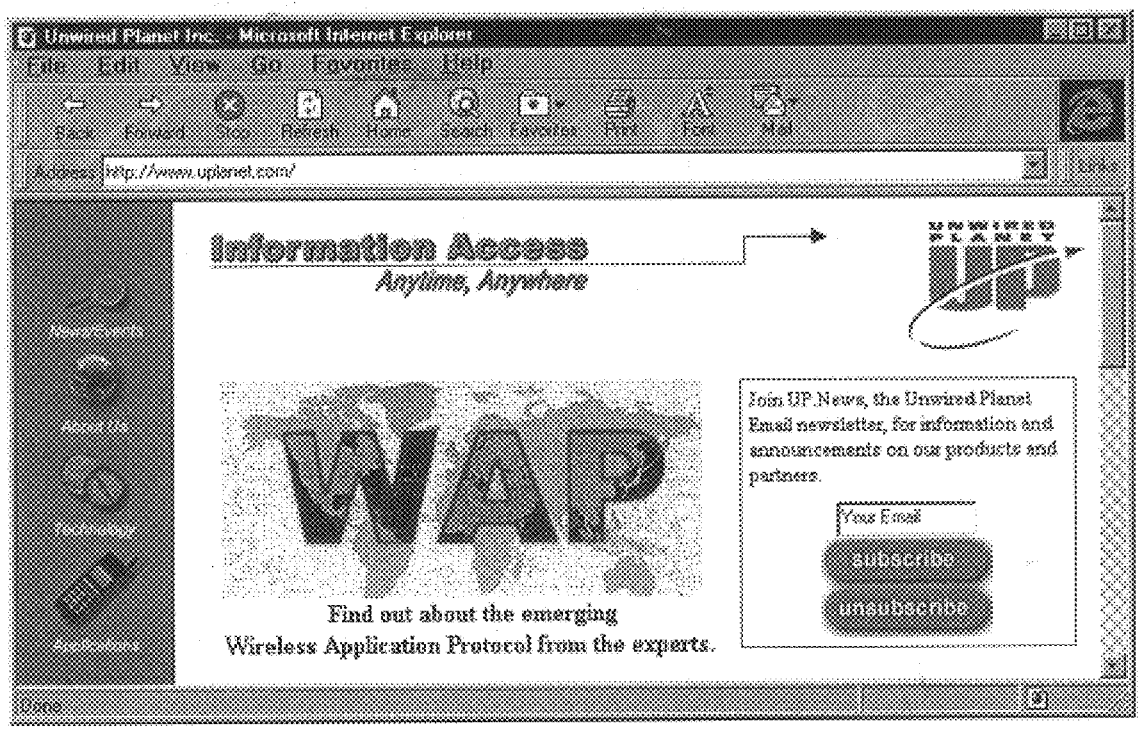
FIGS. 1A–1E are screen shots illustrating basic conventional home page display and linking of resources.
Figure 1B:
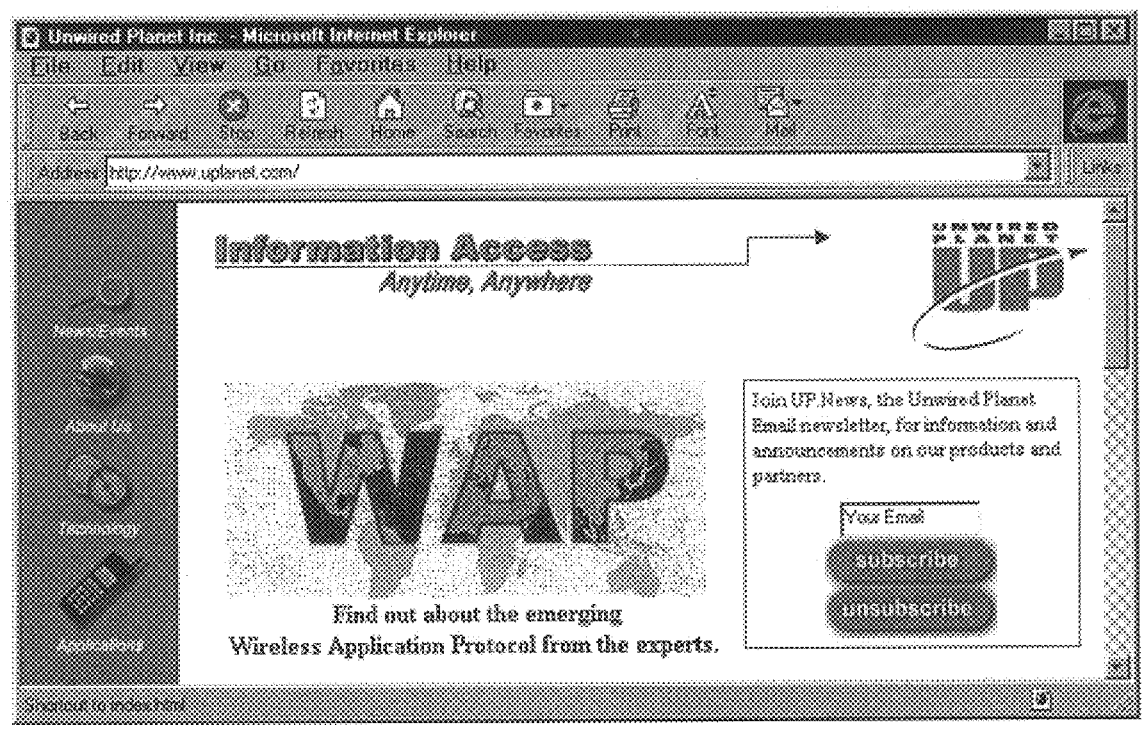
Figure 1C:
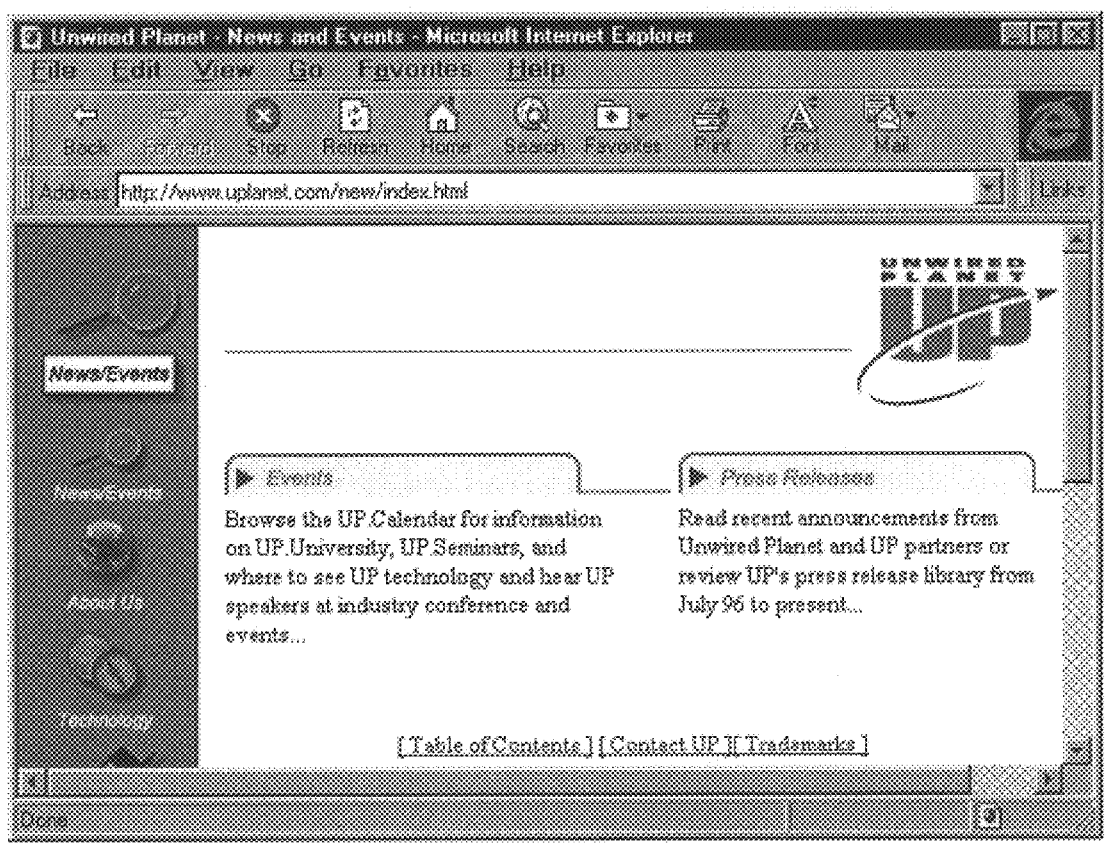
Figure 1D:
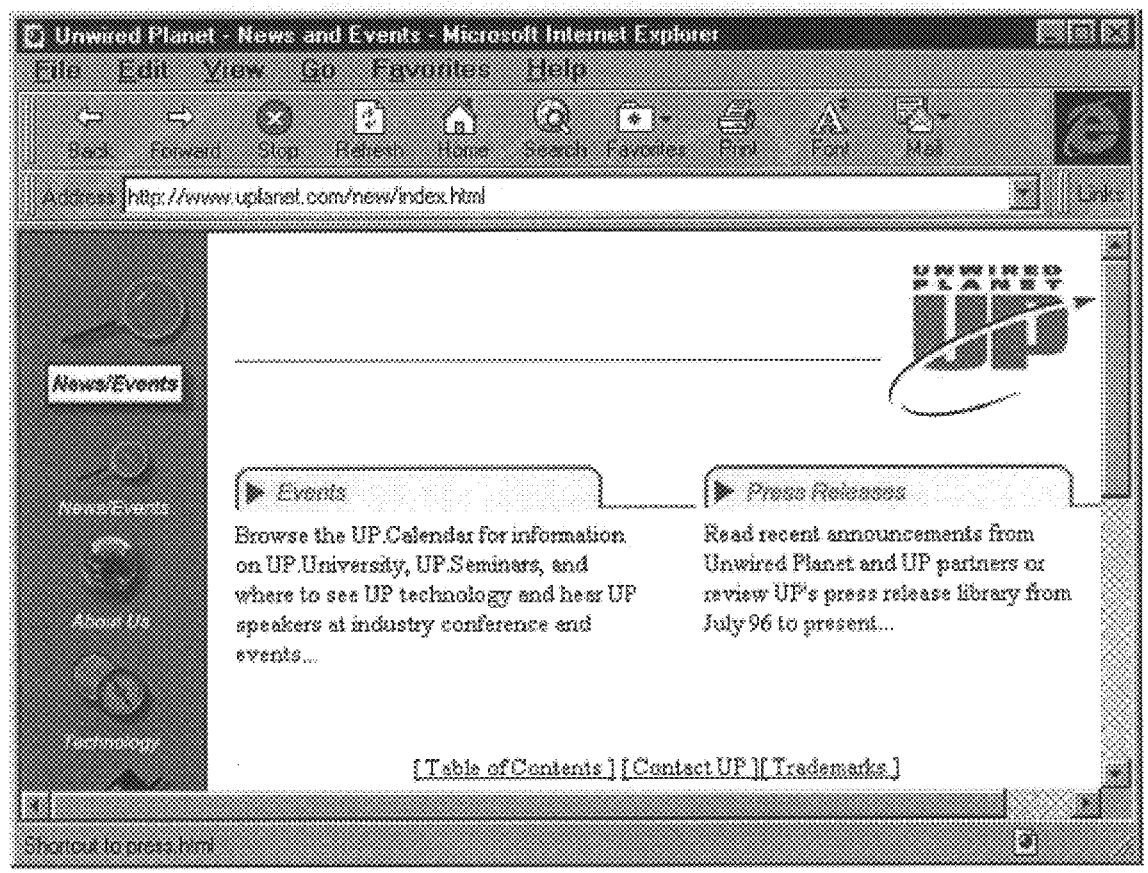
Figure 1E:
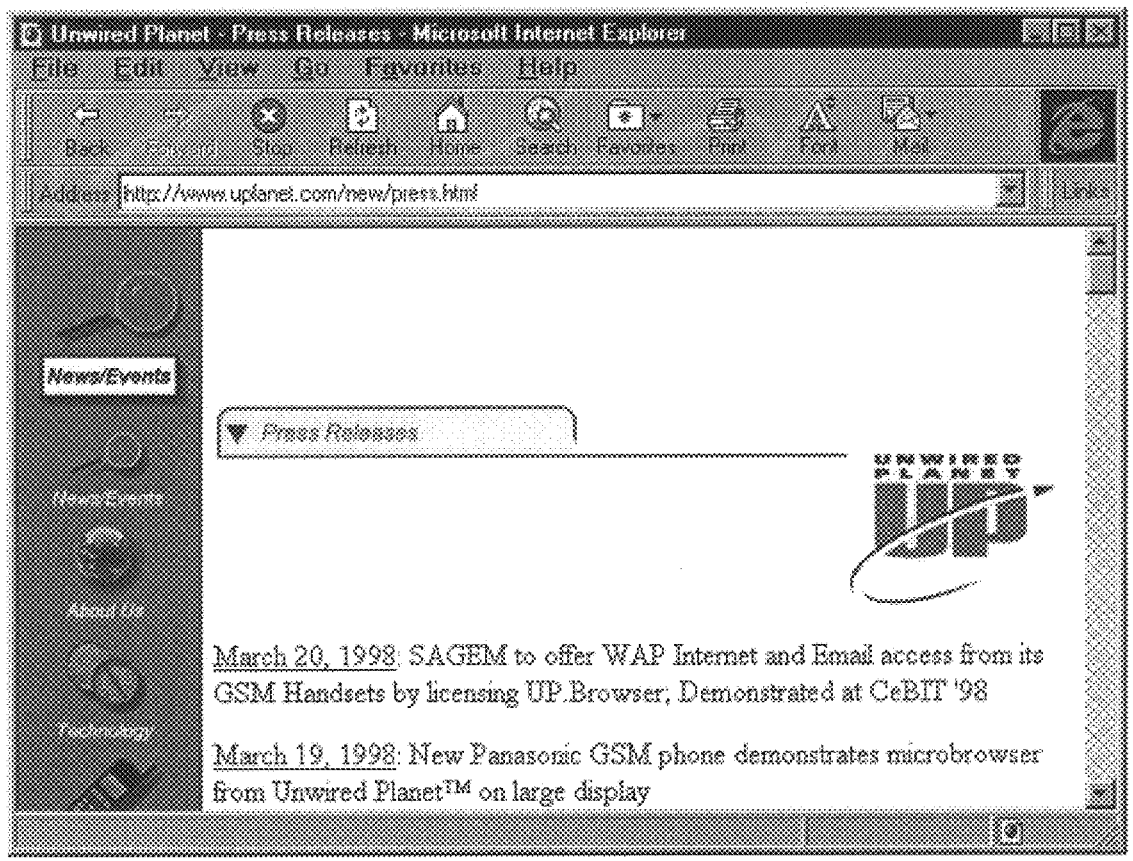
Figure 1F:
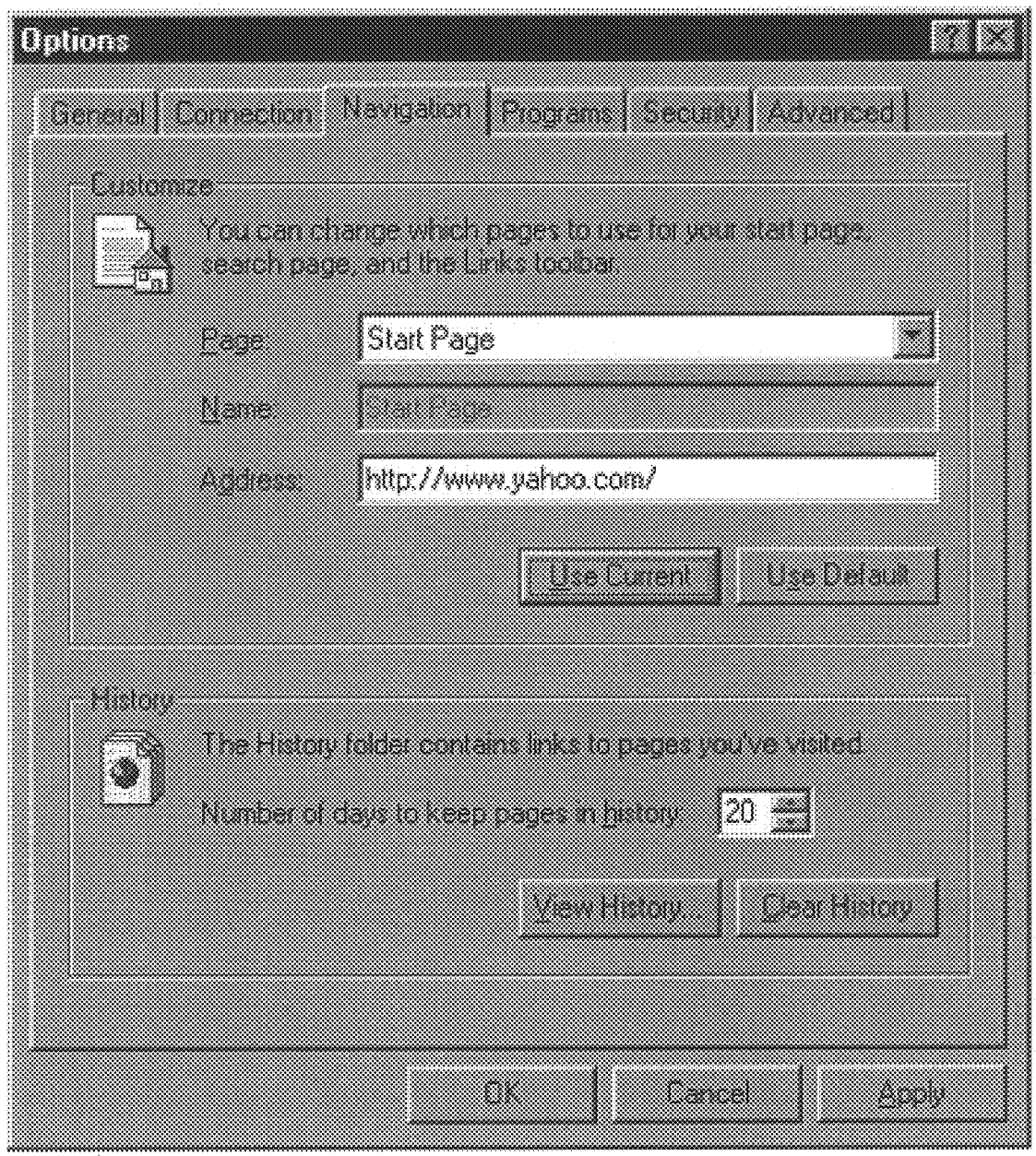
FIGS. 1F and 1G are screen shots of dialog boxes used to change a pre-stored URL for a home page.
Figure 1G:
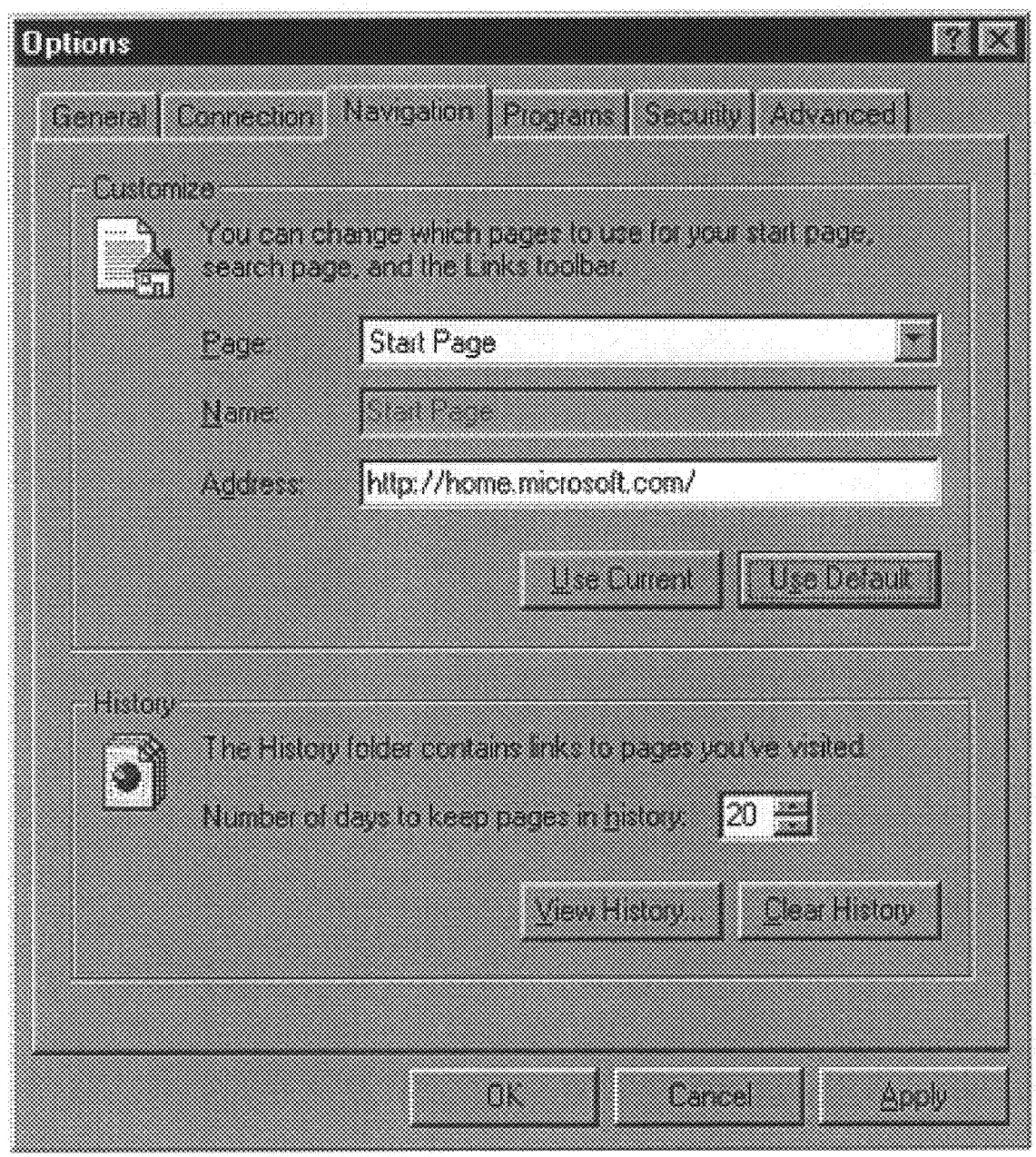
Figure 2:
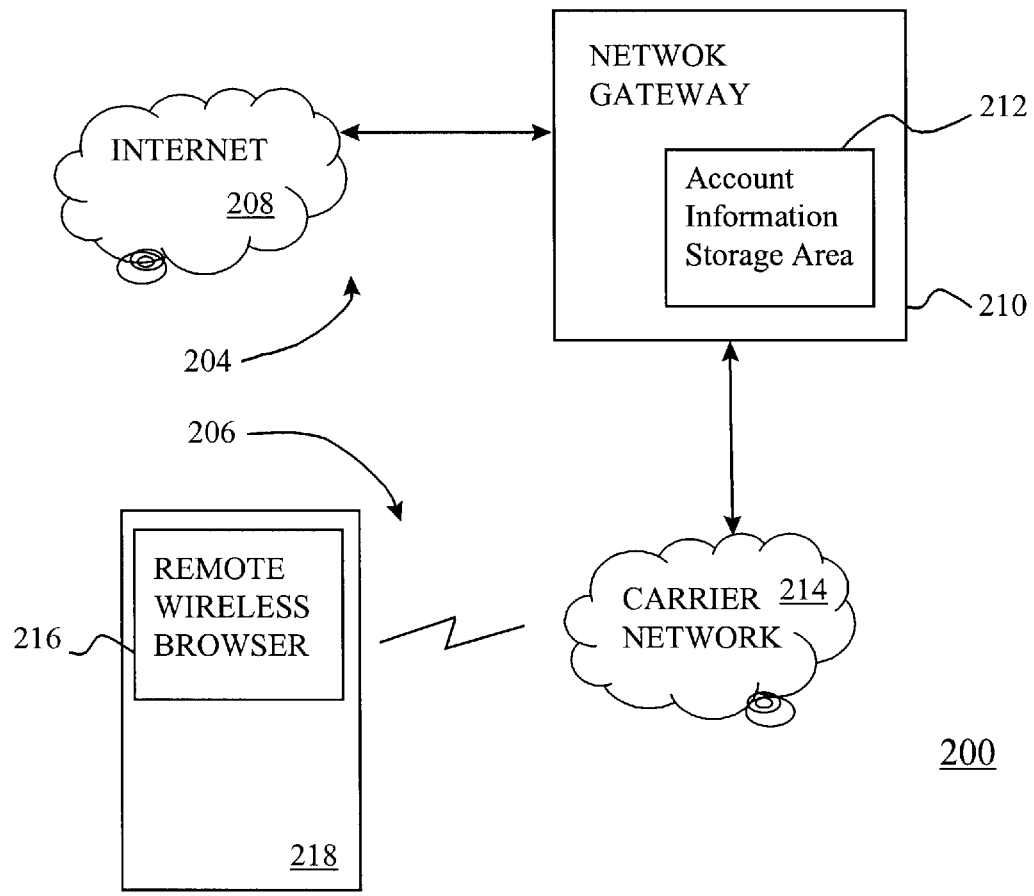
FIG. 2 is a block diagram of a communication system according to an embodiment of the invention.

FIG. 2 is a block diagram of a communication system 200 according to an embodiment of the invention. The communication system 200 includes a wired section 204 and a wireless section 206. The wired section 204 includes the Internet 208 and a network gateway 210. The Internet 208 represents a large number of interconnected computers. The network gateway 210 operates to provide a gateway from the wired section 204 and the wireless section 206. The network gateway 210 will normally perform some protocol translation and other account management and verification operations. The network gateway 210 includes an account information storage area 212 that stores account, configuration and other information. The wireless section 206 includes a carrier network 214 and at least one remote browser 216. It should be noted that the remote browser is so named because the remote browser 216 is usually an application program that executes on a remote computing device. The remote computing device can, for example, be a mobile phone, a personal digital assistant, or a portable general purpose computer. It can be, however, appreciated by those skilled in the art that the disclosed invention is equally applicable to browsers operating in other non-wireless computing devices as well.

Typically, the wireless section 206 will include a plurality of remote wireless browsers 216, each of which executes on a different remote computing device. The configuration and other information stored in the account information storage area 212 can store service limitations, security limitations, preference information and the like for the remote wireless browsers 216. The account information storage area 212 can also store data or pages of data that are of interest to the remote wireless browser 216. The stored data or pages can operate as a cache of information previously requested from the Internet or can operate as an information server within the network gateway 210. For example, as an information server, the storage pages can represent pages to be displayed by the remote wireless browser. Such pages can be specially formatted or customized for use with a remote wireless browser or a particular user of a remote wireless browser.

The communication system 200 allows a user of the remote wireless browser 216 to access the Internet 208 to retrieve data or supply data there-between. During operation, the remote wireless browser 216 couples to the carrier network 214 using wireless communications. The remote wireless browser 216, or a user thereof, can initiate a request for information from the Internet 208. The remote wireless browser 216 forwards the request to the carrier network 214 using wireless communications. Then, the carrier network 214 forwards the request to the network gateway 210, typically using wired communications.

The network gateway 210 serves as a primary transition point between the wireless communication of the wireless section 206 and the wired communication of the wired section 204. Specifically, the network gateway 210 receives the incoming request from the carrier network 214 and performs protocol conversion as necessary and then forwards the request to the Internet 208. Within the Internet 208, the request is directed to a particular server computer. The particular server computer is the server computer within the Internet 208 that stores the resource being requested by the request. Normally, the request contains a Universal Resource Locator (URL) that specifically identifies the resource and its location within the Internet 208. The requested resource, if available, is then obtained from the particular server computer and returned to the network gateway 210. Again, the network gateway 210 can perform protocol conversion as necessary and then forwards the requested resource to the carrier network 214. The carrier network 214, then in turn, transmits the requested resource to the remote wireless browser that had requested the resource using wireless communications.

This configuration and other information stored in the account information storage area 212 can provide service limitations, security limitations, preference information and the like for the remote wireless browsers 216 within the communication system 200. As noted above, the account information storage area 212 can also store data or pages of data that are of interest to the remote wireless browser 216. By properly formatting the pages stored in the account information storage area 212, the remote wireless browser 216 is better able to view the pages on a limited-size screen display.

Given that the remote wireless browser 216 operates on a remote computing device 218, the remote wireless browser can remotely view information stored on the Internet 208. The remote computing device 218 thus is not wired to the Internet 208 but is nevertheless able to couple thereto using wireless communications. According to one embodiment, the remote wireless browser 216 initially references a home page that is preferably displayed on the screen display of the remote computing device 218.

Conventionally, the home page for a remote computing device would be an address or URL stored in the remote computing device supporting the remote wireless browser 216. However, as noted above, this results in several problems. One problem is that resources on the Internet tend to move or change their address (i.e., URL). When this occurs, the remote wireless browser 216 is uninformed and, as a result, the remote wireless browser 216 cannot properly access the desired home page. In this case, it is said that the link URL (i.e., link head) to the home page (i.e., link tail) is incorrect, so that the link fails. Another problem is that often the link URL (i.e., link head) is created in a document or page before the location (e.g., URL) of the resource is known. Here, the link cannot be properly established until the location of the resource (i.e., link tail) becomes known.

The invention overcomes the problems of the conventional approaches through use of an aliasing technique. With the aliasing technique according to the invention, the remote wireless browser needs not know the location of the resource being linked to. Hence, to the remote wireless browser, the actual location of the resource being linked to is irrelevant. As a consequence, the aliasing technique according to the invention provides location-independent resource addressing.

Figure 3A:
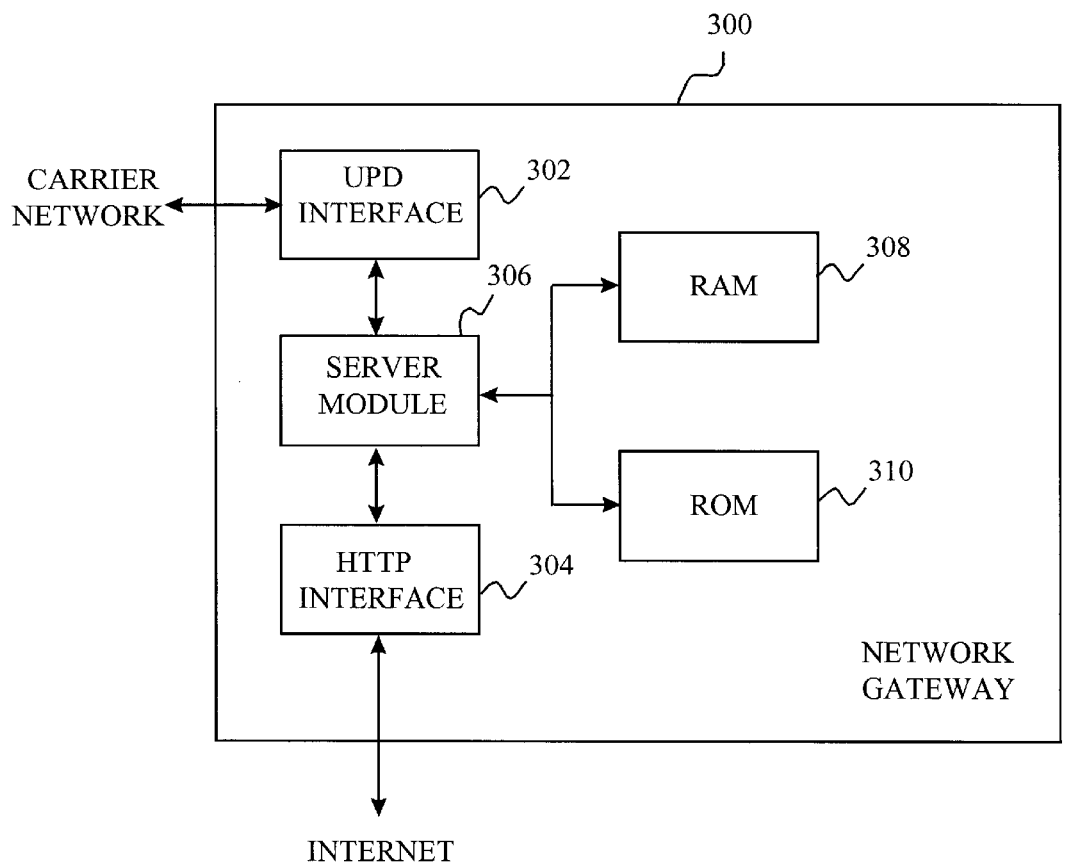
FIG. 3A is a block diagram of a network gateway according to an embodiment of the invention.

FIG. 3A is a block diagram of a network gateway 300 according to an embodiment of the invention. The network gateway 300 can, for example, represent the network gateway 210 illustrated in FIG. 2 and be typically a server computer. To avoid obscuring aspects of the present invention, well known methods, procedures, components, and circuitry in the network gateway 300 are not described in detail.

The network gateway 300 includes a User Datagram Protocol (UDP) interface 302 that couples to the carrier network 214, an HTTP interface 304 that couples to the Internet 208, and a server module 306 coupled between the UDP interface 302 and the HTTP interface 304. The server module 306 performs traditional server processing as well as protocol conversion processing. In particular, the protocol conversion processing includes protocol conversion between UDP and HTTP. Further, to assist the server module 306 in its processing, the network gateway 300 includes a random access memory (RAM) 308 and a read-only memory (ROM) 310. Among other things, the RAM 308 will store device identifiers, subscriber identifiers, configuration information, and alias conversion information. In one embodiment, such information is stored in the RAM 310 as a database. The RAM 310 can represent the account information storage area 212 illustrated in FIG. 2.

Figure 3B:
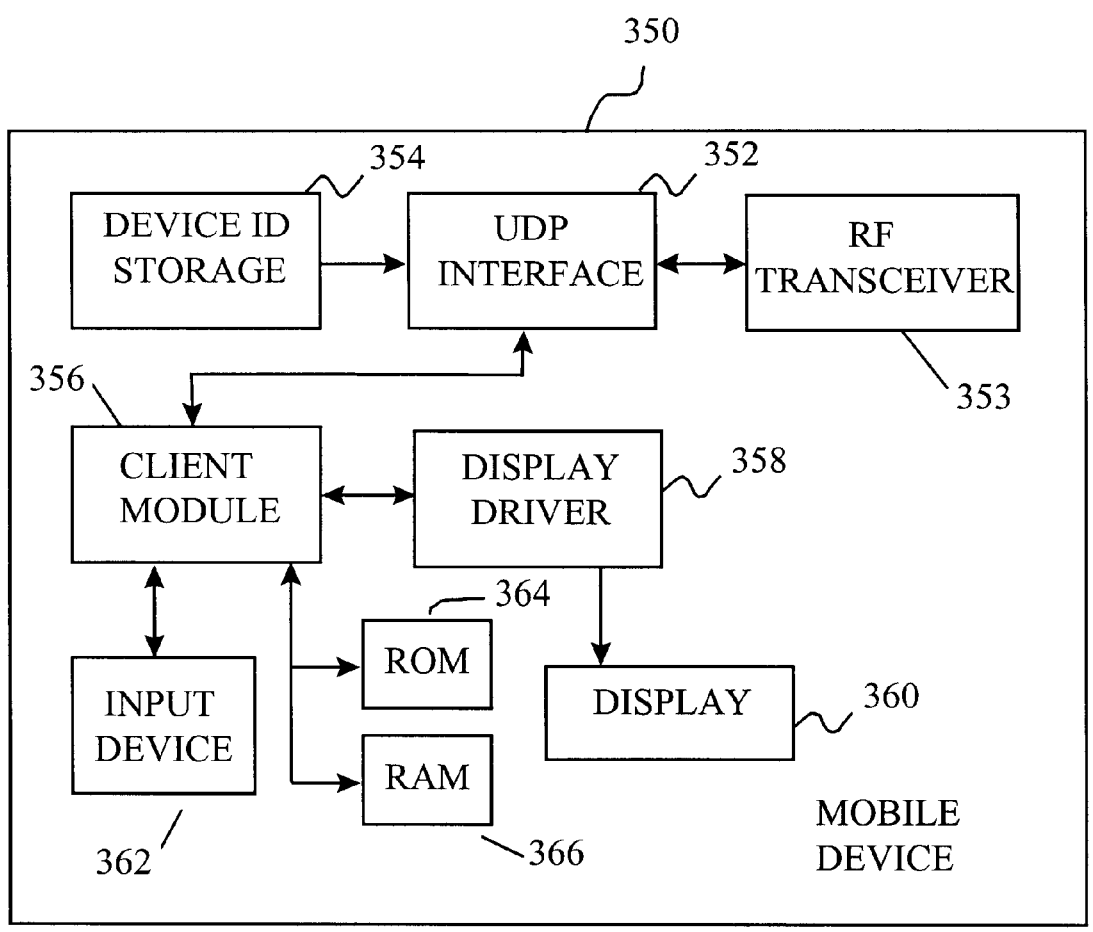
FIG. 3B is a block diagram of mobile device according to an embodiment of the invention.

FIG. 3B is a block diagram of mobile device 350 according to an embodiment of the invention. The mobile device 350 can, for example, correspond to the remote computing device 218 that operates the remote wireless browser 216 illustrated in FIG. 2.

The mobile device 350 includes a UDP interface 352 that couples to the carrier network 214 via a RF transceiver 353 to receive incoming and outgoing signals. A device identifier (ID) storage 354 supplies a device ID to the UDP interface 352. The device ID identifies a specific code that is associated with a particular mobile device 350. In addition, the mobile device 350 includes a client module 356 that performs many of the processing tasks performed by the mobile device 350 including establishing a communication session with the carrier network 214 and the network gateway 210, requesting and receiving data (e.g., pages) from the Internet 208, displaying information on a display of the remote computing device, and receiving user input. The client module 356 is coupled to the UDP interface 352 for the establishment of a communication session and the requesting and receiving of data. The client module 356 also couples to a display driver 358 that drives a display 360. The client module 356 controls the display driver 358 to display information on the display 360 to the user. Additionally, the client module 356 is coupled to an input device 362, a ROM 364, and a RAM 366. Preferably, among other things, the client module 356 operates a network browser, such as a Handheld Device Markup Language (HDML) web browser. The input device 362 allows a user of the mobile device 350 to input data and thus make selections in controlling and using the mobile device 350. The ROM 364 stores predetermined data and processing instructions for the client module 356. The RAM 366 is used to provide temporary data storage for incoming and outgoing data being received and transmitted as well as for storage of an alias table that facilitates the conversion of alias URLs to actual URLs.

Additional details on the design and construction of the network gateway 300 and the mobile device 350 are contained in commonly assigned U.S. patent application Ser. No. 08/570,210, now U.S. Pat. No. 5,809,415 entitled "METHOD AND ARCHITECTURE FOR AN INTERACTIVE TWO-WAY DATA COMMUNICATION NETWORK" by Alain Rossmann now U.S. Pat. No. 5,809,415 which is hereby incorporated by reference in its entirety.

When the remote wireless browser 216 in the remote computing device is activated, it typically requests a communication session with the network gateway 210 and then seeks to display a home page as its initial page of information that is displayed to the user. Hence, prior to obtaining and displaying the home page, the remote computing device performs an initialization processing in order to establish communications with the network gateway 210. The initialization processing and page display processing associated with the invention are described below in FIGS. 4, 5, 6A and 6B.

Figure 4:
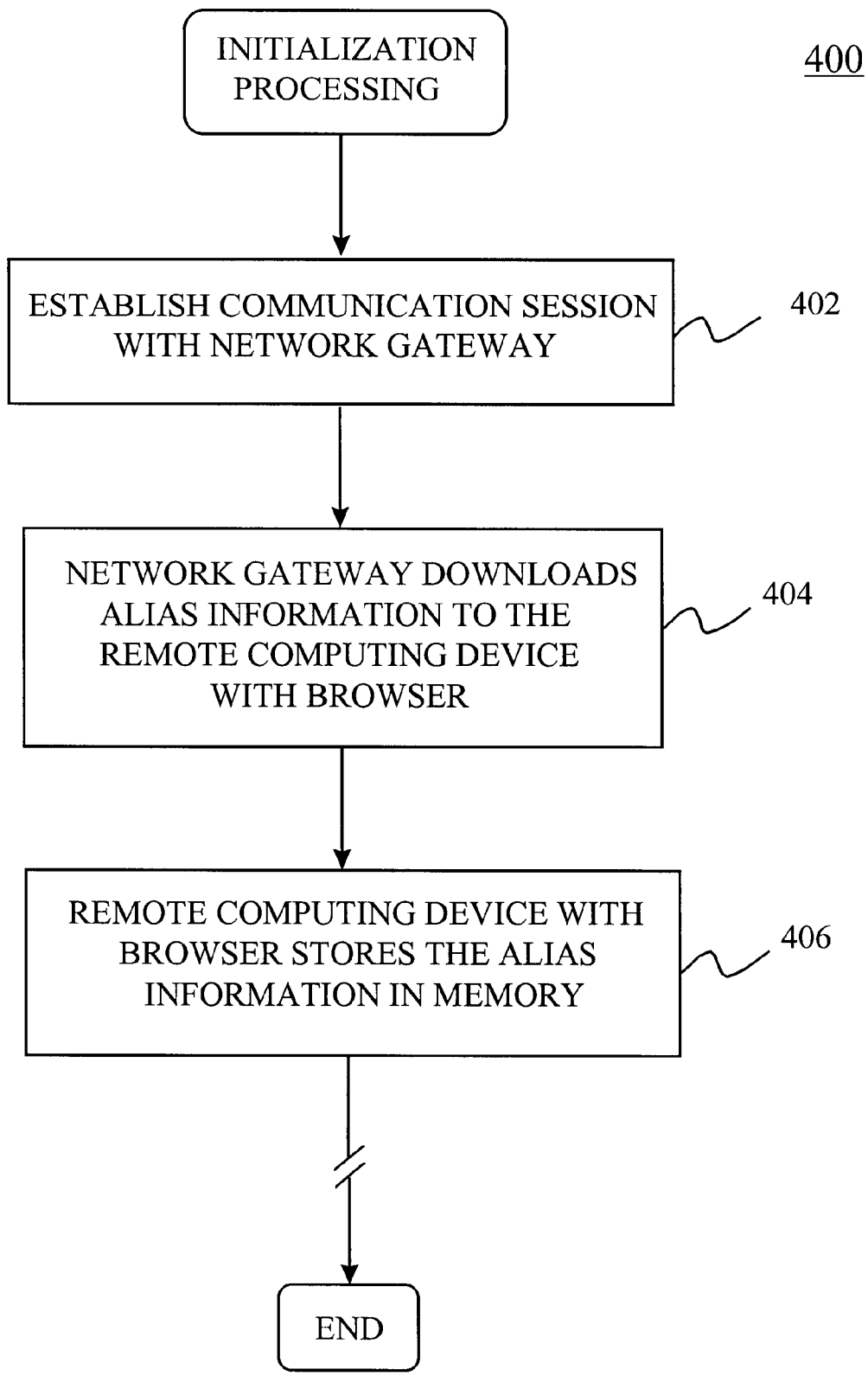
FIG. 4 illustrates a flow diagram of a portion of initialization processing performed by an embodiment of the invention.

FIG. 4 illustrates a flow diagram of a portion of initialization processing 400 performed by an embodiment of the invention. The initialization processing 400 initially establishes 402 a communication session between the mobile device 350 (i.e., remote wireless browser 216) and the network gateway 210. The communication session can be established in a number of different ways. According to one implementation, with respect to FIGS. 2, 3A and 3B, the remote wireless browser 216 executing on the mobile device 350 will communicate with the network gateway 210 via the carrier network 214. The mobile device 350 retrieves its device ID from the device ID storage 354 and forwards it to the network gateway 210. The network gateway 210 receives the device ID and the server module 306 searches the RAM 308 to determine whether the database stored therein recognizes the device ID. If the device ID is recognized, the communication session is permitted. Additionally, if desired, additional authorizations, passwords or other security checks can be performed before permitting the communication session.

Once the communication session has been established, the network gateway 210 downloads 404 alias information to the remote computing device associated with the browser 216. Here, the alias information stored in the database that corresponds with the device ID is downloaded 404 by the network gateway 210 to the remote computing device. The remote computing device then stores 406 the alias information in memory. The downloaded alias information forms an alias table in the remote computing device for use by the remote wireless browser. According to one implementation, with respect to FIGS. 2, 3A and 3B, the alias table can be stored in the RAM 366 of the mobile device 350.

Following block 406, additional initialization processing can be performed between the remote computing device and the network gateway 210 depending upon the particular implementation and application. Such additional initialization processing is not associated with the present invention and not further discussed herein so as to not obscure the invention.

Figure 5:
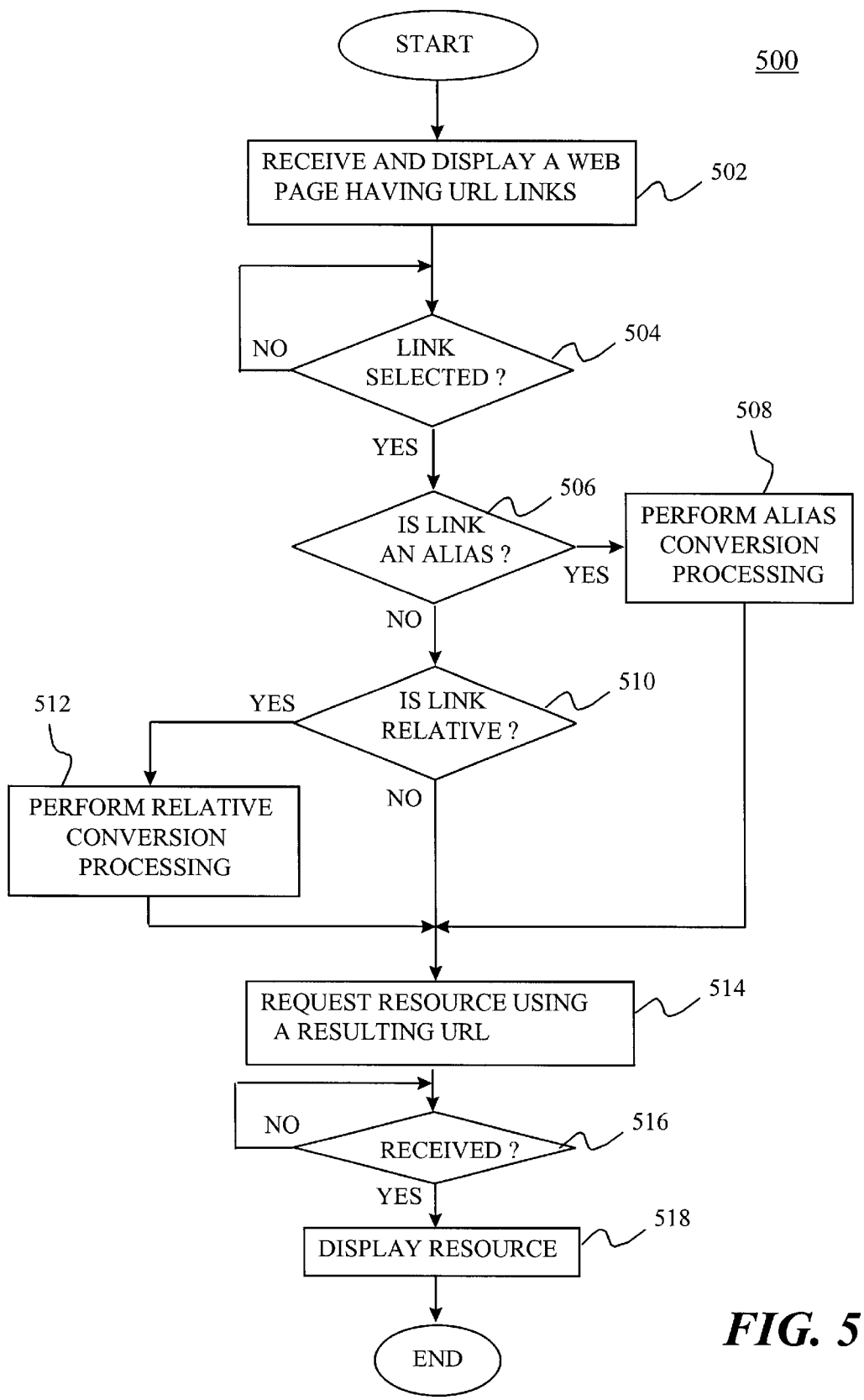
FIG. 5 is a flow diagram of page display processing according to an embodiment of the invention.

FIG. 5 is a flow diagram of page display processing 500 according to an embodiment of the invention. The page display processing 500 is, for example, performed by the remote computing device, e.g., the mobile device 350 illustrated in FIG. 3B.

The page display processing 500 initially receives and displays 502 a web page having URL links. Next, a decision block 504 determines whether a link on the web page has been selected. When the decision block 504 determines that a link has not yet been selected, the page display processing 500 awaits the selection of such a link. In other words, the page display processing 500 does not actually begin until a link is selected. The selection of a particular link to a resource can be performed in a variety of ways. As suggested by blocks 502 and 504, the selected link could be selected by a user who would select a particular URL link of a displayed web page. Alternatively, the selected link could be associated with a startup sequence that would automatically select a link for a home page without the need to display any web page.

Once a URL link has been selected (by a user or automatically), a decision block 506 determines whether the URL link is an alias. If the decision block 506 determines that the link is an alias, then alias conversion processing is performed 508. On the other hand, when the decision block 506 determines that the URL link is not an alias, then a decision block 510 determines whether the URL link is a relative link. When the decision block 510 determines that the URL link is a relative link, then relative link conversion processing is performed 512. Following block 508, block 512, or the decision block 510 when the URL link is not relative, the resource is requested 514 using a resulting URL. Note that the resulting URL is either the result of the alias conversion processing (block 508), the relative link conversion processing (block 512), or no link processing. Normally, the resource being requested is identified by the resulting URL which identifies a location on the Internet 208. Following block 514, a decision block 516 determines whether the requested resource has been received. If the requested resource has not yet been received, the decision block 516 causes the page display processing 500 to await its reception. Once the decision block 516 determines that the requested resource has been received, then the resource is displayed 518. Following block 518, the page display processing 500 is complete and ends.

Figure 6A:
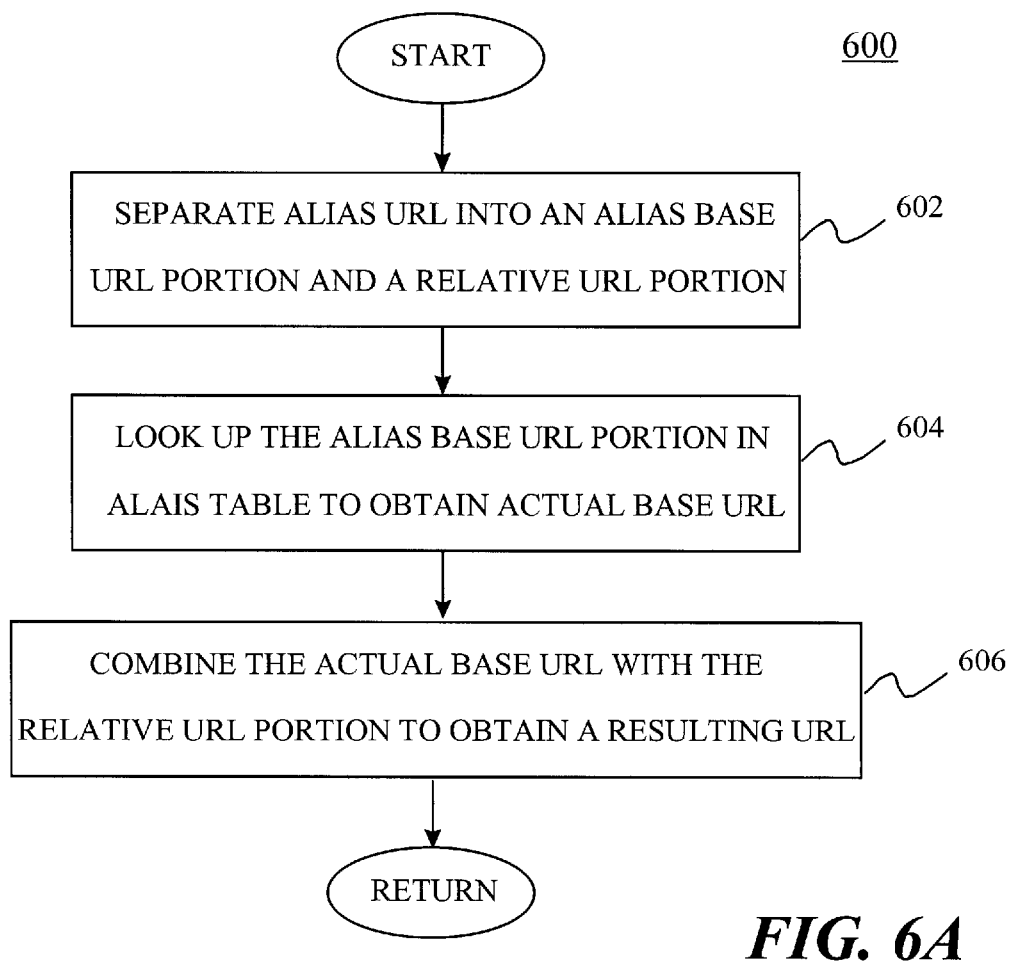
FIG. 6A is a flow diagram of alias conversion processing according to an embodiment of the invention.

FIG. 6A is a flow diagram of alias conversion processing 600 according to an embodiment of the invention. The alias conversion processing 600 is, for example, the processing performed by block 508 in FIG. 5.

The alias conversion processing 602 initially separates 602 the alias URL into an alias base URL portion and a relative URL portion. Next, the alias base URL portion is looked up 604 in an alias table to obtain an actual base URL. Then, the actual base URL is combined 606 with the relative URL portion to obtain the resulting URL. Following block 606, the alias conversion processing 600 is complete and returns.

A representative example of the alias conversion processing 600 is as follows. Assume that a page or document is displayed on a screen display of the remote computing device, and that a user selects a link contained on the page or document. Alternatively, assume that a link is automatically selected by the mobile device 350. In either case, according to the invention, the selected link is associated with an alias address (i.e., alias locator) of a resource being requested. Hence, the selection of the link obtains the alias address. The alias address is then processed in accordance with the alias conversion processing 600. Normally, the alias address is an alias URL, the actual address is an actual URL, and the resulting address is a resulting URL.

Table 1 below illustrates a representative alias table. The alias table associates an alias URL with an actual URL for resources.

TABLE 1

| Alias | Actual Base URL |
|---|---|
| device:home | http://home.cell.com/ |
| device:bookmarks | http://home.cell.com/bookmarks/ |
| • | • |
| • | • |
| • | • |

For example, as shown in Table 1, the alias "device:home" is an alias URL that corresponds or maps to the actual URL "home.cell.com/". Similarly, the alias "device:bookmarks" is an alias URL that corresponds or maps to the actual URL "home.cell.com/bookmarks/". Such an alias table as in Table 1 allows the homepage and bookmarks for the remote wireless browser to be relocated or changed without having to reprogram or physically alter the remote wireless browser's operation.

Further, on a different carrier network, the remote wireless browser normally will have a different homepage. In such a case, Table 2 below illustrates an alias table where the carrier network is Carrier A. Here, the alias table allows the remote wireless browser to display the appropriate homepage and bookmarks for the particular carrier network being utilized by the user. Table 3 below illustrates an alias table where the carrier network is Carrier B. This alias table would have been downloaded from the network gateway supporting either the Carrier A or the Carrier B so that the appropriate homepage and bookmarks would be utilized by the remote wireless browser without burdening the user.

TABLE 2

| Alias | Actual Base URL |
|---|---|
| device:home | http://www.net.com/homepage/ |
| device:bookmarks | http://www.netA.com/homepage/bookmarks/ |
| • | • |
| • | • |
| • | • |

TABLE 3

| Alias | Actual Base URL |
|---|---|
| device:home | http://www.netB.com/homepage/ |
| device:bookmarks | http://www.netB.com/homepage/bookmarks/ |
| • | • |
| • | • |
| • | • |

Besides the use of the alias tables to direct the wireless remote browser to the appropriate homepage and bookmarks depending on carriers, the alias tables are also very useful in directing the remote wireless browser to the appropriate homepage and bookmarks based on a variety of other attributes, including the user, the device, the device type, the service, etc. For example, the alias "device:home" can correspond or map to a particular user's homepage, e.g., "netA.com/homepage/user-x". As another example, the alias "device:home" can correspond or map to a premium service homepage, e.g., "netA.com/homepage/premium/".

Although the alias information is preferably downloaded from the network gateway 210 to the remote computing device (FIG. 4, block 404), it should be recognized that an alternative arrangement would eliminate the need for the downloading by performing the alias conversion processing in the network gateway 210 (i.e., server side). Such an arrangement would require the server to process the incoming request to identify those of the URLs that are alias URLs and perform the alias conversion processing centrally.

Figure 6B:
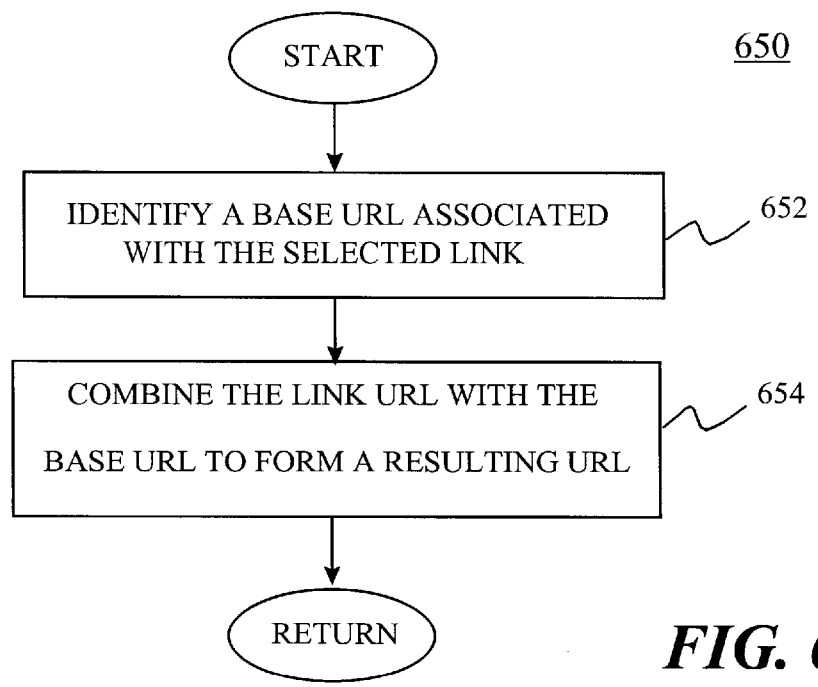
FIG. 6B is a flow diagram of relative URL processing according to an embodiment of the invention.

FIG. 6B is a flow diagram of relative URL processing 650 according to an embodiment of the invention. The relative URL processing 650 is, for example, the processing performed in block 512 of FIG. 5. The relative URL processing 650 initially identifies 652 a base URL associated with the selected link. Next, the link URL is combined 654 with the base URL to form a resulting URL. Following block 654, the relative URL processing 650 is complete and ends.

It should be noted that in a preferred embodiment of the relative URL processing 650 is performed as described in Internet Standard -RFC 1808 which describes Relative Uniform Resource Locators. See, R. Fielding, Relative Uniform Resource Locators, Network Working Group, RFC 1808, June 1995, which was incorporated by reference above.

Another aspect of the invention concerns the caching of resources identified by an alias using an actual URL. Most browsers implement a cache of previously fetched network resources, (e.g., HTML pages, HDML decks, TIF images, GIF images, etc.). Normally, the resources are identified by their actual URLs and cached using the actual URLs. However, when the resources are identified within the browser by an alias URL, this aspect of the invention stores the resources in the cache using the actual URLs. In other words, actual URLs or resulting URLs (and not the alias URLs) are used to store the resources in the cache.

By storing actual URLs in the cache according to this aspect of the invention, the aliasing provided by other aspects of the invention remains transparent to the network server that is providing the resources. As a result, management of the cache can be performed using conventional approaches without any need for changes due to the use of the aliasing techniques of other aspects of the invention. Additionally, changes to the alias table are transparently handled by the cache. For example, outdated entries in the cache are ignored and new resources are stored as entries after being fetched.

The advantages of the invention are numerous. One advantage of the invention is that links can be created without prior knowledge of the location (e.g., URL) of the resource being linked. As a particular example, the aliasing techniques can provide flexible, in-browser linking to an appropriate home page or preferences (e.g., bookmarks). Another advantage of the invention is that it allows network servers to relocate its resources or otherwise reorganize its site. Still another advantage of the invention is that external events can alter the linking to different resources even after the link (i.e., link head) is created.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for displaying a home page on a display screen associated with a remote client-side computing device operating a browser program and being coupled to a network server, said method comprising:
   (a) identifying, at the remote client-side computing device, an alias URL that corresponds to the home page to be displayed on the display screen;
   (b) downloading alias data from the network server to the remote client-side computing device;
   (c) converting, within the remote client-side computing device, the alias URL to a resulting URL in accordance with the downloaded alias data;
   (d) requesting the home page from the network server using the resulting URL; and
   (e) thereafter displaying the home page received from the network server on the display screen of the remote client-side computing device,
   wherein the downloaded alias data pertains to a plurality of alias URLs to be stored in a data storage of the remote client-side computing device, and
   wherein said downloading (b) of the alias data from the network server is performed prior to use of the downloaded alias data by said converting (c).

2. A method as recited in claim 1, wherein said converting (c) is performed by the browser program operating in the remote client-side computing device.

3. A method as recited in claim 1, wherein said converting (c) is performed using a look-up table stored in the remote client-side computing device, the look-up table storing the downloaded alias data.

4. A method as recited in claim 1, wherein the browser program is coupled to a network server in a wireless manner.

5. A method as recited in claim 1, wherein the remote client-side computing device is a mobile device having the display screen integrally formed therewith.

6. A method as recited in claim 1, wherein the alias URL for the home page is a location independent such that the operation of the remote client-side computing device is independent of any changes in an actual URL for the home page.

7. A method as recited in claim 1, wherein the downloaded alias data populates a conversion table within the remote client-side computing device, and
   wherein said converting (c) converts the alias URL to the resulting URL using the conversion table.

8. A method as recited in claim 1, wherein the downloaded alias data comprises a conversion table formed at the network server, and
   wherein said converting (c) converts the alias URL to the resulting URL using the conversion table.

9. A method as recited in claim 1, wherein the remote client-side computing device has a unique device identifier associated therewith, and wherein the downloaded alias data for the remote client-side computing device is obtained from the network server based on the unique device identifier.

10. A method as recited in claim 1, wherein the network server is a gateway server,
    wherein a subscriber is associated with the remote client-side computing device, and the gateway server maintains an account for the subscriber, and
    wherein the downloaded alias data for the remote client-side computing device is dependent on the status of the account of the subscriber.

11. A method as recited in claim 1, wherein by altering the downloaded alias data, the home page being displayed can be changed by an operator of the network server.

12. A method as recited in claim 1, wherein a network administrator can alter configuration of the remote client-side computing device based on the downloaded alias data supplied to the remote client-side computing device during said downloading.

13. A method for displaying a home page on a display screen associated with a remote client-side computing device operating a browser program and being coupled to a network server, said method comprising:
    (a) identifying at the remote client-side computing device, an alias URL that corresponds to the home page to be displayed on the display screen;
    (b) converting, within the remote client-side computing device the alias URL to a resulting URL using a look-up table;
    (c) requesting the home page from the network server using the resulting URL; and
    (d) thereafter displaying the home page received from the network server on the display screen of the remote client-side computing device, wherein the remote client-side computing device includes a memory, and wherein said converting (b) comprises:
(b1) downloading the look-up table from the network server;
(b2) storing the look-up table in the memory of the remote client-side computing device;
(b3) indexing into the look-up table using the alias URL to identify an actual URL associated with the alias URL; and
(b4) forming the resulting URL based on the actual URL.

14. A method as recited in claim 13, wherein the look-up table stored in the memory associates alias URLs to actual URLs.

15. A method for displaying a page on a display screen associated with a remote wireless client computing device operating a browser program and being coupled to a network server in a wireless manner, said method comprising:
(a) identifying a link URL that corresponds to a page to be displayed on the display screen by the browser program;
(b) determining whether the link URL is an alias URL and downloading alias data from the network server to the remote wireless client computing device;
(c) converting, within the remote wireless client computing device, the link URL to a resulting URL based on the downloaded alias data previously received from the network server when said determining (b) determines that the link URL is an alias URL;
(d) requesting the page from the network server using the resulting URL; and
(e) thereafter displaying the page received from the network server on the display screen of the remote wireless client computing device,
wherein the downloaded alias data pertains to a plurality of alias URLs to be stored in a data storage of the remote wireless client computing device, and
wherein said downloading of the alias data from the network server is performed prior to use of the downloaded alias data by said converting (c).

16. A method as recited in claim 15, wherein said method further comprises:
(f) determining whether the link URL is a relative URL; and
(g) converting, within the remote wireless client computing device, the link URL to a resulting URL in accordance with a base URL associated with a page containing the link URL when said determining (f) determines that the link URL is a relative URL and said determining (b) determines that the link URL is not an alias URL.

17. A method as recited in claim 15, wherein the remote wireless client computing device is a mobile device having the display screen integrally formed therewith.

18. A method as recited in claim 15, wherein the page to be displayed on the display screen is a home page associated with the remote wireless client computing device.

19. A method as recited in claim 15, wherein said converting (c) is performed by the browser program operating in the remote wireless client computing device.

20. A method for displaying a page on a display screen associated with a remote wireless client computing device operating a browser program and being coupled to a network server in a wireless manner, said method comprising:
(a) identifying a link URL that corresponds to a page to be displayed on the display screen by the browser program;
(b) determining whether the link URL is an alias URL;
(c) converting, within the remote wireless client computing device, the link URL to a resulting URL when said determining (b) determines that the link URL is an alias URL;
(d) requesting the page from the network server using the resulting URL; and
(e) thereafter displaying the page received from the network server on the display screen of the remote wireless client computing device,
wherein said converting (c) is performed using a look-up table stored in the remote wireless client computing device,
wherein the remote wireless client computing device includes a memory, and
wherein said converting (c) comprises:
(c1) downloading the look-up table from the network server;
(c2) storing the look-up table in the memory of the remote wireless client computing device;
(c3) indexing into the look-up table using the alias URL to identify an actual URL associated with the alias URL; and
(c4) forming the resulting URL based on the actual URL.

21. A method as recited in claim 20, wherein the alias URL for the page is a location independent such that the operation of the remote wireless client computing device is independent of any changes in an actual URL for the page.

22. A method for displaying a page on a display screen associated with a remote wireless client computing device operating a browser program and being coupled to a network server in a wireless manner, said method comprising:
(a) identifying a link URL that corresponds to a page to be displayed on the display screen by the browser program;
(b) determining whether the link URL is an alias URL;
(c) converting the link URL to a resulting URL when said determining (b) determines that the link URL is an alias URL;
(d) requesting the page from the network server using the resulting URL; and
(e) thereafter displaying the page received from the network server on the display screen of the remote wireless client computing device,
wherein the remote wireless client computing device includes a memory, and
wherein said converting (c) comprises:
(c1) dividing the alias URL into an alias base URL portion and a relative URL potion;
(c2) looking up the alias base URL portion in an alias table to obtain an actual base URL; and
(c3) combining the actual base URL with the relative URL portion to obtain the resulting URL wherein the alias table is stored in the remote wireless client computing device, and at least a portion of the contents of the alias table is obtained by download from the network server.

23. A method as recited in claim 22,
wherein said converting (c) is performed within the remote wireless client computing device.

24. A method as recited in claim 23,
wherein the remote wireless client computing device is a mobile device having the display screen integrally formed therewith, and
wherein the page to be displayed on the display screen is a home page associated with the remote wireless client computing device.

25. A mobile device, comprising:
a memory, said memory storing a browser and an alias table; and
a device controller operatively coupled to said memory, said device controller operates to execute said browser and to evaluate link requests by said browser to determine whether the link requests are aliases, and for each of the link requests that are determined to be an alias, operates to convert the alias to an actual link in accordance with alias information stored in the alias table,
wherein the alias information is downloaded to the alias table from a network server;
wherein said mobile device is a portable computing device including a display screen,
wherein said device controller further operates to request a resource from a network as identified by the actual link associated with the alias, and upon receipt of the resource at said portable computing device operates to display the resource on said display screen, and
wherein the downloaded alias information for a plurality of alias entries to be stored in the alias table is downloaded to the alias table from the network server prior to use of the alias table by said device controller to convert the alias into the actual link.

26. A mobile device as recited in claim 25, wherein the alias table comprises an actual homepage link that corresponds to a homepage alias.

27. A mobile device as recited in claim 25, wherein the alias table comprises an actual bookmark link that corresponds to a bookmark alias.

28. A mobile device as recited in claim 25, wherein the alias table enables the actual link corresponding to an alias to depend on external events or settings.

29. A mobile device as recited in claim 25, wherein said mobile device is a portable computing device and wherein the network server is a network gateway, and
wherein said portable computing device couples to the network gateway which in-turn couples to the Internet.

30. A mobile device as recited in claim 29, wherein the alias information for the alias table is downloaded from the network gateway to said portable computing device each time said portable computing device is initialized.

31. A mobile device as recited in claim 30, wherein said memory includes RAM and ROM, and
wherein the alias table is stored in the RAM.

32. A mobile device as recited in claim 25,
wherein said portable computing device is coupled to a network of computers through wireless communications, the network of computers storing resources.

33. A mobile device as recited in claim 32, wherein the resource requested is supplied to said portable computing device as an information page, and the information page is displayed on said display screen.

34. A mobile device that couples to a network server, comprising:
a display screen; and
a computer readable media storing computer program instructions for operating a browser program and for storing computer program instructions for displaying a page on said display screen,
wherein the computer program instructions for displaying the page on said display screen include:
program code for identifying a link URL that corresponds to the page to be displayed on the display screen by the browser program;
program code for determining whether the link URL is an alias URL;
program code for downloading alias data from the network server to the mobile device;
program code for converting the link URL to a resulting URL based on the downloaded alias data previously received from the network server when said program code for determining determines that the link URL is an alias URL;
program code for requesting the page from the network server using the resulting URL; and
program code for displaying the page received from the network server on the display screen,
wherein the downloaded alias data pertains to a plurality of alias URLs to be stored in a data storage of the mobile device, and
wherein said program code for downloading of the alias data from the network server operates to perform the downloading prior to use of the downloaded alias data by said program code for converting.

35. A mobile device as recited in claim 34, wherein said mobile device is a mobile telephone and has said display screen integral therewith.

36. A mobile device as recited in claim 34,
wherein said mobile device includes volatile memory storage, and
wherein said program code for converting utilizes a look-up table stored in said volatile memory storage, the look-up table containing the downloaded alias data.

37. A mobile device as recited in claim 36, wherein said program code for converting comprises:
program code for storing the look-up table in said volatile memory storage;
program code for indexing into the look-up table using the alias URL to identify an actual URL associated with the alias URL; and
program code for forming the resulting URL based on the actual URL.

38. A computer readable medium containing program code for displaying a page on a display screen associated with a remote client-side computing device coupleable to a network server, said computer readable medium comprising:
first program code for identifying a link URL that corresponds to a page to be displayed on the display screen;
second program code for determining whether the link URL is an alias URL and downloading alias data from the network server to the remote client-side computing device;
third program code, within the remote client-side computing device, for converting the link URL to a resulting URL based on the alias data previously downloaded from the network server when said second program code determines that the link URL is an alias URL;
fourth program code for requesting the page from the network server using the resulting URL; and
fifth program code for thereafter displaying the page received from the network server on the display screen of the remote client-side computing device, wherein the downloaded alias data pertains to a plurality of alias URLs to be stored in a data storage of the remote client-side computing device, and wherein said second program code for downloading of the alias data from the network server operates to perform the downloading prior to use of the downloaded alias data by said third program code.

39. A computer readable medium as recited in claim 38, wherein the remote client-side computing device is a mobile device having the display screen integrally formed therewith.

40. A method of managing pages displayed on a display screen associated with a client-side computing device operating a browser program, said method comprising:

(a) identifying a link URL that corresponds to a page to be displayed on the display screen by the browser program;

(b) determining whether the link URL is an alias URL and downloading alias conversion information from a remote server-side computing device to the client-side computing device;

(c) converting, at the client-side computing device, the link URL to a resulting URL when said determining (b) determines that the link URL is an alias URL using alias conversion information received at the client-side computing device from the remote server-side computing device;

(d) requesting the page from a remote network server using the resulting URL;

(e) thereafter displaying the page received from the remote network server on the display screen of the client-side computing device; and (f) caching the page received from the remote network server based on the resulting URL, wherein the downloaded alias conversion information pertains to a plurality of alias URLs to be stored in a data storage of the client-side computing device, and wherein said downloading of the alias conversion information from the network server is performed prior to use of the downloaded alias conversion information by said converting (c).

41. A method as recited in claim 40, wherein said displaying (e) and said caching (f) are provided by the browser program.

42. A computer readable medium containing program code for displaying a web page on a display screen associated with a remote client-side computing device operating a browser program and being coupled to a network server, said computer readable medium comprising:

program code for identifying an alias URL that corresponds to the web page to be displayed on the display screen;

program code for downloading alias conversion information from the network server to the remote client-side computing device;

program code for substituting, within the remote client-side computing device a resulting URL for the alias URL based on the alias conversion information previously downloaded from the network server;

program code for requesting the web page from the network server using the resulting URL; and program code for thereafter displaying the web page received from the network server on the display screen of the remote client-side computing device, wherein the downloaded alias conversion information pertains to a plurality of alias URLs to be stored in a data storage of the remote client-side computing device, and wherein said program code for downloading of the alias conversion information from the network server operates to perform the downloading prior to use of the downloaded alias conversion information by said program code for substituting.

43. A method for displaying a page on a display screen associated with a remote wireless client computing device operating a browser program and being coupled to a network server in a wireless manner, said method comprising:

(a) identifying a link URL that corresponds to a page to be displayed on the display screen by the browser program;

(b) determining whether the link URL is a relative URL and downloading base data from the network server to the remote wireless client computing device;

(c) converting, within the remote wireless client computing device, the link URL to a resulting URL when said determining (b) determines that the link URL is a relative URL, and after said downloading (b) downloads the base data from the network server said converting (c) including at least (c1) identifying a base URL that is associated with the link URL, and (c2) combining the base URL with the link URL to obtain the resulting URL;

(d) requesting the page from the network server using the resulting URL; and (e) thereafter displaying the page received from the network server on the display screen of the remote wireless client computing device, wherein the downloaded base data pertains to a plurality of alias URLs to be stored in a data storage of the remote wireless client computing device, and wherein said downloading of the base data from the network server is performed prior to use of the downloaded base data by said converting (c).

* * * * *